(12) United States Patent
Asher

(10) Patent No.: US 7,940,670 B2
(45) Date of Patent: *May 10, 2011

(54) ALGORITHM FOR NETWORK ROUTE SELECTION

(75) Inventor: Michael L. Asher, Green Cove Springs, FL (US)

(73) Assignee: AT&T Intellectual Property II, L.P.

( * ) Notice: Subject to any disclaimer, the term of this patent is extended or adjusted under 35 U.S.C. 154(b) by 0 days.

This patent is subject to a terminal disclaimer.

(21) Appl. No.: 12/620,098

(22) Filed: Nov. 17, 2009

(65) Prior Publication Data

US 2010/0061275 A1    Mar. 11, 2010

Related U.S. Application Data

(63) Continuation of application No. 11/818,048, filed on Jun. 12, 2007, now Pat. No. 7,623,462.

(51) Int. Cl.
*G06F 15/173*   (2006.01)
*H04L 12/24*    (2006.01)

(52) U.S. Cl. .............. 370/238; 370/255; 709/238
(58) Field of Classification Search .............. None
See application file for complete search history.

(56) References Cited

U.S. PATENT DOCUMENTS

| | | | | |
|---|---|---|---|---|
| 6,044,075 | A * | 3/2000 | Le Boudec et al. | 370/351 |
| 6,088,333 | A * | 7/2000 | Yang et al. | 370/238 |
| 6,606,668 | B1 * | 8/2003 | MeLampy et al. | 709/241 |
| 6,944,131 | B2 * | 9/2005 | Beshai et al. | 370/238.1 |
| 6,985,959 | B1 * | 1/2006 | Lee | 709/238 |
| 7,139,834 | B1 * | 11/2006 | Albanese et al. | 709/238 |
| 7,146,000 | B2 * | 12/2006 | Hollman et al. | 379/221.06 |

* cited by examiner

*Primary Examiner* — Chi H Pham
*Assistant Examiner* — Soon-Dong D Hyun

(57) ABSTRACT

A method for selecting a path in a physical network that selects nodes for the path based on the coordinates of the nodes in a representation of the subject network in space. From a working node M that is included in the selected path, the next node that is selected for the path is a node N such that (a) a link MN exists, and (b) the link MN forms an angle relative to a line that connects working node with the destination node that is smaller than the angle that any other link from node M forms with the line that connects working node with the destination node.

1 Claim, 2 Drawing Sheets

_US 7,940,670 B2_

ALGORITHM FOR NETWORK ROUTE SELECTION

REFERENCE TO RELATED APPLICATIONS

This application is a continuation of U.S. application Ser. No. 11/818,048, filed Jun. 12, 2007 now U.S. Pat. No. 7,623,462.

BACKGROUND

This invention relates to networks and, more particularly, to network path selections, or identifications.

Many real-world applications can be viewed to comprise a network that includes nodes that are interconnected by links where, typically, each link has a cost that is associated with traversing the link. The costs of traversing a link in the two directions need not be the same. The typical objective is to identify a path from one node of the network (source node, s) to another node of the network (destination or terminus node, t) that is a least-cost path. This objective is usually achieved by representing the network with a mathematical entity known as a directed graph, or digraph, where nodes, or vertices, of a digraph represent the network links, and edges of the digraph that interconnect the nodes represent network links. The least-cost path problem is solved mathematically on the digraph by employing principles that have been developed by digraphs generally, and the solution is then applied to the network.

The application is, of course, dependent on the network. To give one example, the application may be communications, in which case the network may be the telecommunication network, and the least-cost problem may be the problem of identifying a least-cost route for a call or a plurality of calls. Applying the solution to the network is also dependent on the particular application. It may be providing information for the process of establishing a connection along the least-cost route, re-routing a whole set of existing connections in response to a change in the network because of a failure at some node, or it may be just storing the path information for potential connections that are high priority connections. To give another example, the application may be transporting goods over the highways, in which case the network is the network of highways, the least cost problem often is the problem of identifying the least cost route for moving the goods from city A to city B. In this case, applying the solution to the network may be embodied in the process of giving instructions to a driver to execute the movement of the goods from city A to city B.

The classic algorithm for single-source shortest-path in a digraph with non-negative edge weights is the Dijkstra algorithm. For the above-mentioned goods movement application, for example, the vertices of the digraph graph represent cities, the edge weights represent the driving distances between pairs of cities connected by a direct road, and the Dijkstra's algorithm finds the shortest route between any two cities.

The input of the Dijkstra algorithm consists of a weighted directed graph G and a source vertex s in G. The vertices of G form a set V, and the edges of the graph G form a set E. The algorithm computes the least costly path from the source vertex to each of the other vertices in V. In one implementation, the algorithm maintains two sets of vertices S and Q. Set S contains all vertices for which the least cost path is already known (initially, empty), and set Q contains all other vertices (initially, the entire set of vertices, V). The algorithm also maintains an array d of best estimates of shortest path to each vertex, and an array p of a predecessor for each vertex in Q. For example, if a vertex $u_i$ in Q can be reached from $u_j$, $u_k$, and $u_l$, and the costs are such that reaching node $u_i$ from $u_k$ is the least costly, then the predecessor vertex of $u_i$ is $u_k$.

Set S starts empty, and in each of the algorithm's iterations one vertex is moved from Q to S. The vertex that is chosen is the vertex with lowest cost from the source node.

The algorithm is:
While Q is not empty:
1. Sort the vertices in Q according to the current best estimate of their distance from the source,
2. Select the vertex u in Q with the lowest cost, and add it to S (and delete it from Q),
3. Relax all the vertices still in Q connected to u; that is, compute the cost of extending the path from u to all nodes that are directly reachable from u, and return to step 1.

It is noted that step 1 in the above algorithm sorts all vertices in Q and step 2 chooses the vertex with the smallest cost.

It is quite clear that the running time for finding the lowest cost path from one vertex being the source vertex to another vertex being the destination vertex can vary from one situation to another based on the particular costs that are extant. It can be shown that the Djikstra algorithm has a worst case running time on the order of $V^2$. Since the Djikstra algorithm operates by expanding shortest paths around the source node, worst case performance is common, and for large networks, this can involve significant processing times.

SUMMARY OF THE INVENTION

An advance in the art is realized with a method and apparatus that, for a certain kind of network, employs an algorithm that uses a different criterion for selecting the next node than the criterion used by the Djikstra algorithm. Specifically, the disclosed algorithm selects the next node based on the coordinates of the node in a representation of the subject network in space. More specifically, from a working node M that is included in the selected path, the next working node that is selected for the path is a node N such that (a) a link from node M to node N exists, and (b) the link from node M to node N forms an angle relative to a line that connects the working node with the destination node that is smaller than the angle that any other link from node M forms with the line that connects the working node with the destination node.

DETAILED DESCRIPTION

Many real-world networks, such as the telecommunication network, possess attributes that are not recognized by digraphs. For instance, the shortest path in a telecommunication network from Chicago to New York is unlikely to run through Los Angeles. Similarly, in a network of streets and roads, the quickest route between two points in a city is likely to remain in or very near that city. For purposes of this disclosure, any network (graph) that can be oriented in space so that the distance between vertices correspond, even if just approximately, to the costs of moving between the vertices, is termed herein a Euclidian graph, or network. Often such networks can be oriented in 2-dimensional space, but the principles disclosed herein apply to w-dimensional space.

An advance in the art is achieved by taking advantage of the position of nodes in the space of the Euclidian network, recognizing that the solution might not be optimum but is likely to be quite satisfactory. Typically, the algorithm disclosed herein is considerably faster than the Djikstra algorithm.

Figure 1:
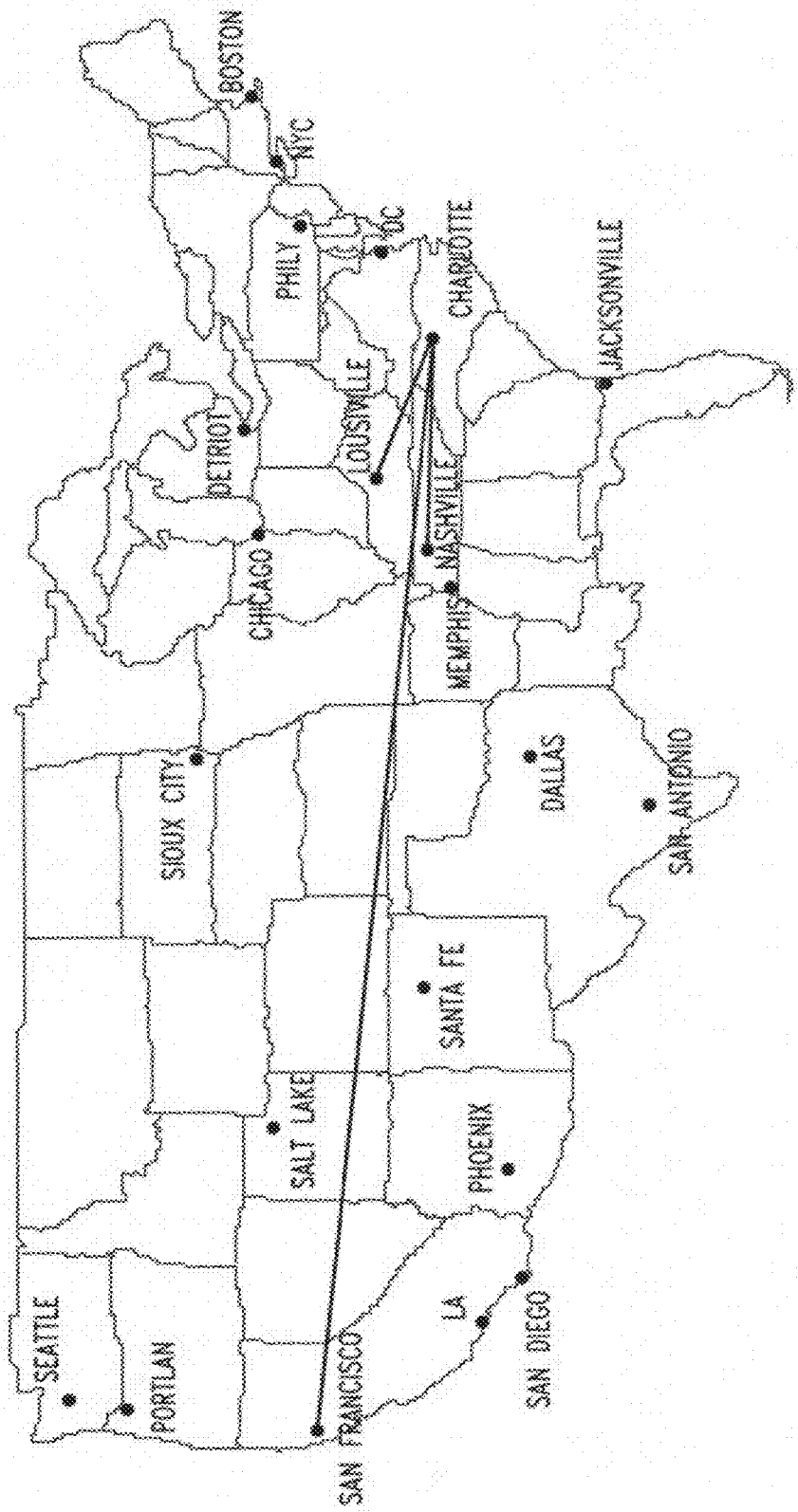
FIG. 1 presents a network with nodes and links, and illustrates the principles disclosed herein for selecting nodes in the course of identifying a least cost path.

FIG. 1 depicts an illustrative telecommunication network of nodes, and links between the nodes, which corresponds to the telecommunications network of mainland United States, with the assumption that to a fair degree of approximation the cost of traversing the network corresponds to the lengths of the links between the nodes. In other words, the FIG. 1 network is a Euclidian network.

Figure 2:
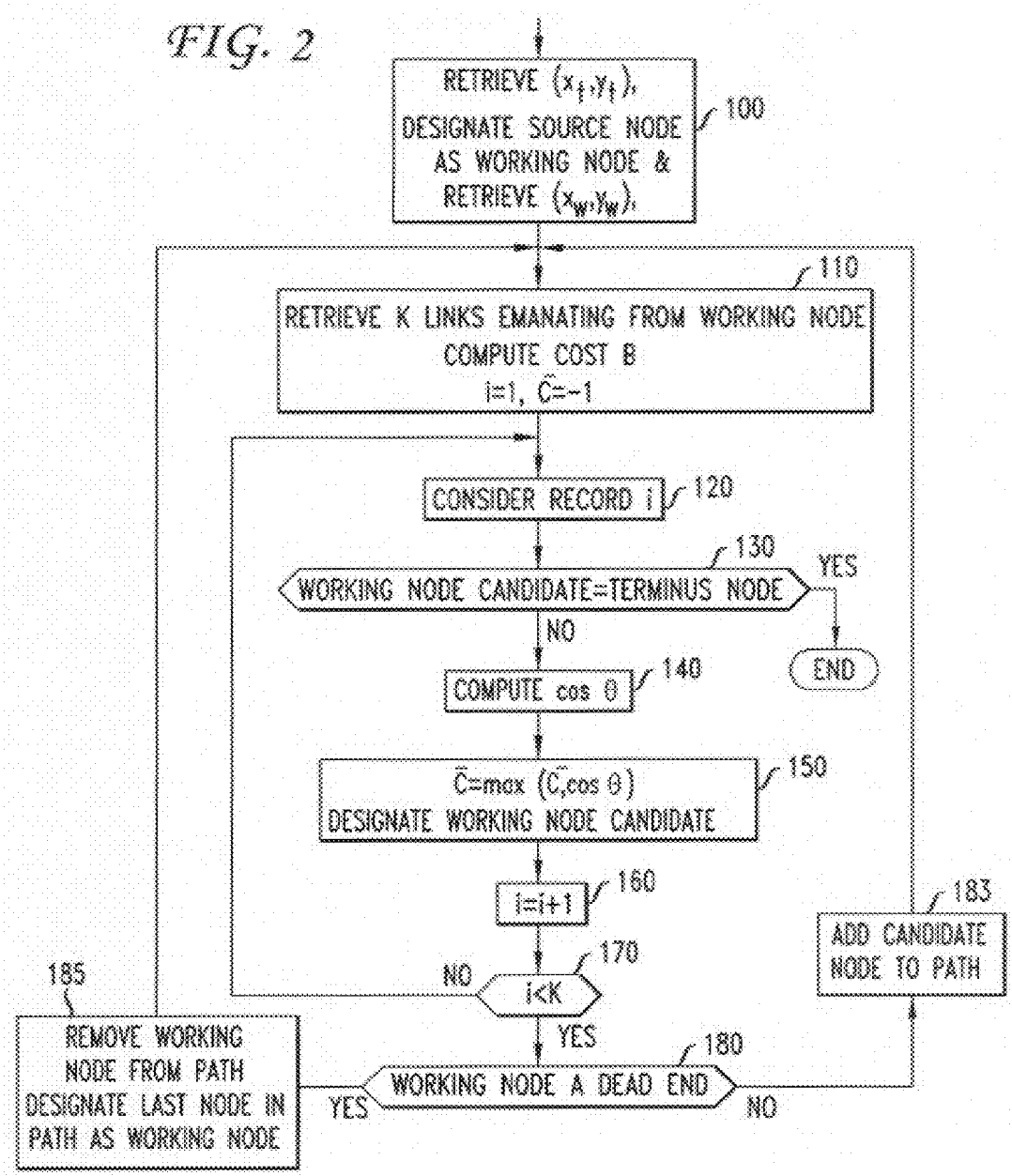
FIG. 2 depicts a flow chart in accord with the principles disclosed herein.
Figure 3:
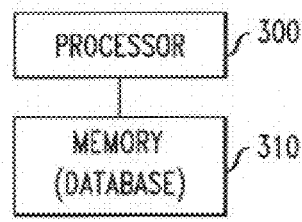
FIG. 3 illustrates a processor arrangement where the disclosed method may be practiced.

Illustratively, the question that needs to be resolved is what is the least cost path from source node Charlotte (N.C.) to destination node San Francisco (Calif.), and FIG. 2 presents a flowchart of the method for identifying that path, the method being executed on processor 300, shown in FIG. 3, that has access to a database 310 of all of the links in the network. Illustratively, the records within the database have the form:

| beginning node | $x_1, y_1$ | Ending node | $x_2, y_2$ | A |
|---|---|---|---|---|

That is, the first field identifies the source node of the link (e.g., Charlotte), the second field ($x_1, y_1$) specifies the geographical coordinates of the link's source node, the third field specifies the destination node of the link (e.g., Nashville), the fourth field ($x_2, y_2$) specifies the geographical coordinates of the link's destination node, and the fifth field (A) specifies the cost of traversing the link (that is, from Charlotte, to Nashville). It is noted that in the context of a Euclidian network/graph, the cost A corresponds to the magnitude of the vector from Charlotte to Nashville; i.e., from ($x_1, y_1$) to ($x_2, y_2$).

Not unlike the Djikstra algorithm, the process disclosed herein and shown in FIG. 2, begins at the source vertex and proceeds toward the destination in a stepwise fashion.

At step 100 the process begins by obtaining from the database the geographical coordinates of the terminus node t (San Francisco), i.e., ($x_t, y_t$), designating the source node s (Charlotte) as the working node, and retrieving from the database the coordinates of the working node ($x_w, y_w$). In step 110 that follows, all links that emanate from the working node are retrieved from database 210, thus forming a set of K links, and in preparation for the process of selecting the next working node, index i is set to 1 and a ceiling for cos θ—which is discussed below—, $\overline{C}$, is set to −1.

In accord with the principles of this disclosure, the node that is selected as the next working node is the node that forms the smallest angle θ between line from the current working node to the selected node and the line from the current working node to the terminus node (as compares to the angle that would result by selecting any other node). FIG. 1 shows the angle θ when San Francisco is the terminus node, Charlotte is the working node and Louisville is the next working node candidate.

It is quite clear that when the origin is considered to be at the working node, a vector $v_1$ from the origin to the terminus node is represented by $$(x_t-x_w, y_t-y_w),$$

and a vector $v_2$ from the origin to the next working node candidate is represented by $$(x_c-x_w, y_c-y_w)$$

where ($x_c, y_c$) are the coordinates of the candidate node. By definition, the dot product of vectors $v_1$ and $v_2$ is $v_1 \cdot v_2 = |v_1||v_2| \cos \theta$, where θ is the angle between the vectors, and in accordance with the approach stated above, it is desired to identify a working node candidate—i.e., vector $v_2$—that yields the smallest θ. The angle θ can be obtained from the equation below $$\theta = \cos^{-1} \frac{v_1 \cdot v_2}{|v_1||v_2|} \qquad (1)$$

but obtaining θ from the arccosine cannot be done in closed form. While θ can be obtained from equation (1) by means of a table lookup, it is noted that the cosine of an angle is inversely but monotonically related to the magnitude of the angle. That is, as θ approaches 0, cosine θ approaches 1, which means when comparing two cosine values, selecting the larger value is tantamount to selecting the smaller angle. Hence, in accord with one embodiment of the disclosed method, the working node candidate that is selected as the next working node is the candidate that has the largest cosine value. As noted above, $|v_2|=A$, and it is also noted that $|v_1|$ corresponds to the magnitude of the line from the working node to the terminus node, B. Therefore, what is sought is the candidate node with the largest $$\cos\theta = \frac{v_1 \cdot v_2}{AB} \qquad (2)$$
$$= \frac{(x_t-x_w)(w_c-x_w)+(y_t-y_w)(y_c-y_w)}{AB}.$$

In comparing two cos θ terms it is noted that value B is the same and, therefore, the comparison may be simply of ratios $$\cos\theta = \frac{(x_t-x_w)(x_c-x_w)+(y_t-y_w)(y_c-y_w)}{A}. \qquad (3)$$

At step 120, the processor selects for consideration record i from the set of K entries that were retrieved from the database, and passes control to step 130 where it is determined whether the considered record corresponds to the terminus node. If so, the process ends. Otherwise, control passes to step 140 where the computer computes cos θ according to equation (2) and passes control to step 150. At step 150, if cos θ > $\overline{C}$ then $\overline{C}$ is made equal to cos θ, and the node of the considered record (found in the third field of the record) is designated as the working node candidate. Otherwise $\overline{C}$ is left unchanged.

At step 160 the index i is incremented, and in step 170 that follows a determination is made whether i is less than K. If so, control passes to step 120 where another record (link) is considered.

It is recognized that a node X might be reached and considered in steps 110 et seq. that is a dead end in the sense that all other links that emanate from node X effectively go backwards, which is indicated by the fact that cos θ is negative. This dead end situation is ameliorated by a back tracking and "tree pruning" approach. Simply described, if in a path A→B→C→D it is discovered where node D is a dead end node, the method backtracks to the previous node, C, deletes node D from further consideration, and tries to find another node that is coupled to node C and is not a dead end node. This is realized by control passing to step 180 when i is not less than K, where a decision is made whether the working node is a dead end node. If it is not, the candidate node is added to the path in step 182 and control is passed to step 110. Otherwise, step 185 removes the working node from the path and also from further consideration, the immediately previous node in the path is designated the working node, and control also is passed to step 110.

The invention claimed is:

1. A method executed in a processor for identifying a path, in a network that has network nodes and links that interconnect the nodes, from a first network node having known latitude and longitude coordinates, to a second network node having known latitude and longitude coordinates, comprising the steps of:
   assigning said first node as working node that belongs to said path;
   identifying all nodes of said network that have a direct link to said working node as potential nodes;
   for each of said potential nodes,
      obtaining latitude and longitude coordinates information;
      computing a value related to an angle between a line that connects said working node to said second node, defined by said latitude and longitude coordinates of said working node and said second node, and a line that connects said working node to said potential node, defined by said latitude and longitude coordinates of said working node and said potential node;
      if said value indicates that said angle a better choice than a current best choice angle, identifying said angle as best current choice angle and said potential node as best node choice;
   choosing the best node choice as working node and as a node that is included in said path; and
   unless the chosen working node is said second node, returning to said step of identifying, and otherwise not returning to said step of identifying.

* * * * *